US012664435B2

(12) United States Patent
Benyahia et al.

(10) Patent No.: US 12,664,435 B2
(45) Date of Patent: *Jun. 23, 2026

(54) METHODS AND SYSTEMS FOR NEURAL ARCHITECTURE SEARCH

(71) Applicant: Swisscom AG, Bern (CH)

(72) Inventors: Yassine Benyahia, Bern (CH); Kamil Bennani-Smires, Bern (CH); Michael Baeriswyl, Bern (CH); Claudiu Musat, Bern (CH)

(73) Assignee: Swisscom AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,052

(22) Filed: Jun. 3, 2024

(65) Prior Publication Data

US 2024/0354579 A1 Oct. 24, 2024

Related U.S. Application Data

(63) Continuation of application No. 16/586,363, filed on Sep. 27, 2019, now Pat. No. 12,001,957.

(30) Foreign Application Priority Data

Sep. 27, 2018 (EP) ..................................... 18197366
Jan. 31, 2019 (EP) ..................................... 19154841

(51) Int. Cl.
*G06N 3/086* (2023.01)
*G06F 18/24* (2023.01)
(Continued)

(52) U.S. Cl.
CPC ............. *G06N 3/086* (2013.01); *G06F 18/24* (2023.01); *G06F 40/20* (2020.01); *G06N 3/045* (2023.01); *G06N 3/048* (2023.01)

(58) Field of Classification Search
CPC ........ G06N 3/086; G06N 3/048; G06N 3/045; G06F 40/20; G06F 18/24
(Continued)

(56) References Cited

U.S. PATENT DOCUMENTS

2017/0124451 A1* 5/2017 Barham ................... G06N 3/08
2017/0213127 A1 7/2017 Duncan
(Continued)

OTHER PUBLICATIONS

Liu et al., "Hierarchical representations for efficient architecture search", ICLR 2018, Feb. 22, 2018 (Year: 2018).*
(Continued)

*Primary Examiner* — Tsu-Chang Lee
(74) *Attorney, Agent, or Firm* — MCANDREWS, HELD & MALLOY, LTD.

(57) ABSTRACT

Methods and systems are provided for neural architecture search. In a system with suitable processing circuitry, a preferred model may be determined for performing a selected task, with the determining including obtaining a computational graph that includes a plurality of nodes and a corresponding plurality of weightings configured to scale input data into the nodes. The computational graph defines a first model and a second model with each of the models including a subgraph in the computational graph, with one or more of the plurality of weightings being shared between the first model and the second model. One or more weightings of each of the models may be updated based on training of each of the models to perform the selected task, and the preferred model may be identified based on an analysis of both models. A neural network for performing the selected task may be configured based on the preferred model.

16 Claims, 6 Drawing Sheets

(51) Int. Cl.
  G06F 40/20 (2020.01)
  G06N 3/045 (2023.01)
  G06N 3/048 (2023.01)
(58) Field of Classification Search
  USPC ............................................................ 706/15
  See application file for complete search history.

(56) References Cited

U.S. PATENT DOCUMENTS

2018/0204111 A1    7/2018  Zadeh et al.
2019/0377831 A1    12/2019  Zhang

OTHER PUBLICATIONS

"Efficient Neural Architecture Search via Parameter Sharing", Arxiv. Org., Cornell University Library, Feb. 9, 2018, 11 pages.
"Overcoming Catastrophic Forgetting in Neural Networks", James Kirkpatrick, et al., PNAS, vol. 114, No. 13, Mar. 28, 2017, 13 pages.
"Learning Without Forgetting", Zhizhong Li, et al., International Conference on Computer Analysis of Images and Patterns, Jan. 1, 2016, vol. 9908, pp. 614-629.
"Reinforced Continual Learning", Ju Xu et al., Arxiv. Org., Cornell University Library, May 31, 2018, 10 pages.
Extended European Search Report for EP19154841, dated Aug. 6, 2019, 11 pages.
Hardesty et al., "Explained: Neural networks", MIT News Apr. 14, 2017 (Year: 2017).

* cited by examiner

400

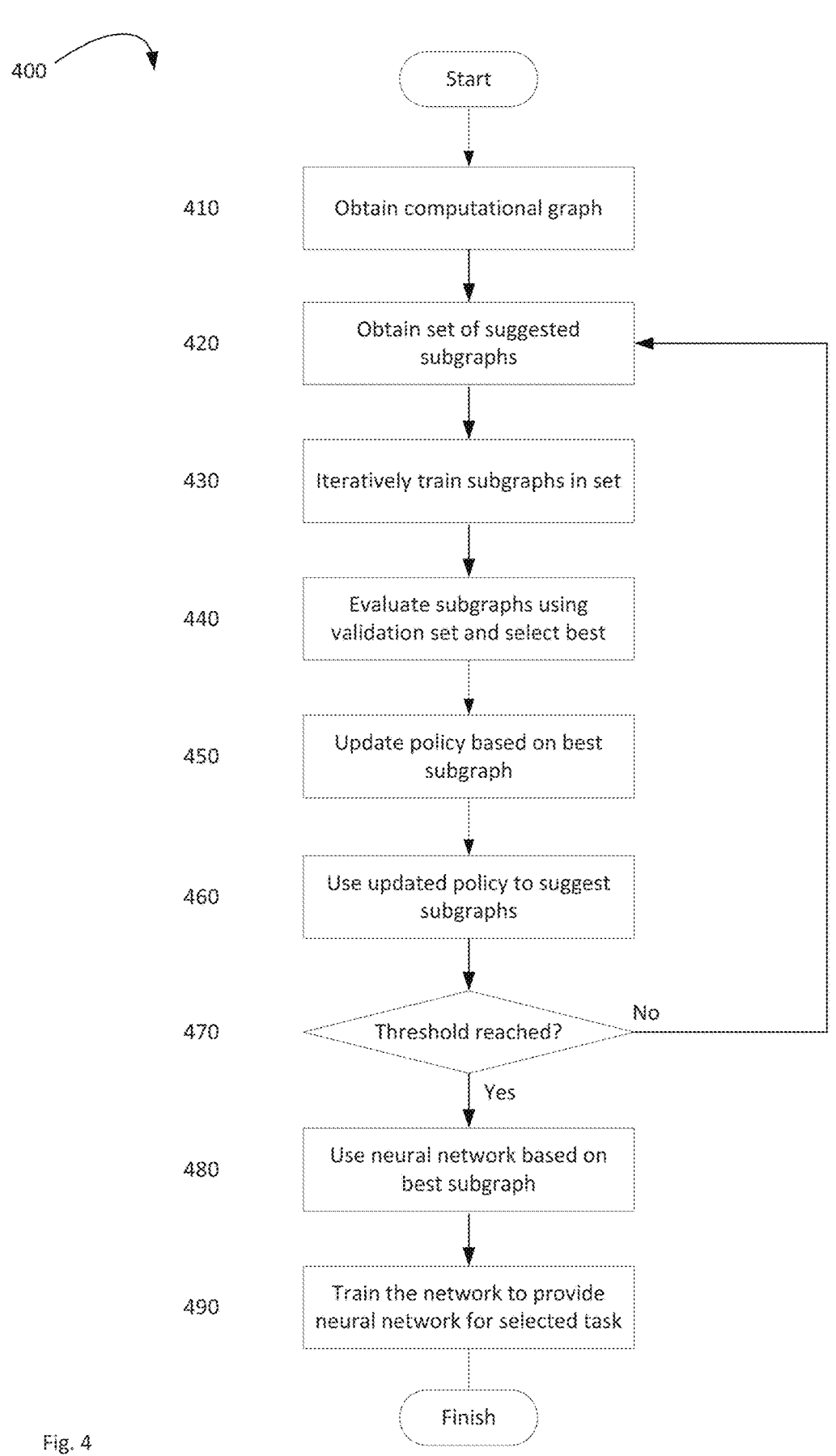

Start

410    Obtain computational graph

420    Obtain set of suggested subgraphs

430    Iteratively train subgraphs in set

440    Evaluate subgraphs using validation set and select best

450    Update policy based on best subgraph

460    Use updated policy to suggest subgraphs

470    Threshold reached?    No

Yes

480    Use neural network based on best subgraph

490    Train the network to provide neural network for selected task

Finish

Fig. 4

METHODS AND SYSTEMS FOR NEURAL ARCHITECTURE SEARCH

CLAIM OF PRIORITY

This patent application is a continuation of U.S. patent application Ser. No. 16/586,363, filed on Sep. 27, 2019, which claims the right of priority to and from European (EP) patent application Ser. No. 18197366.0, dated Sep. 27, 2018, and European (EP) patent application Ser. No. 19154841.1 dated Jan. 31, 2019. Each of the above applications is hereby incorporated herein by reference in its entirety.

TECHNICAL FIELD

The present disclosure relates to computing solutions. In particular, various embodiments in accordance with the present disclosure relate to methods and systems for designing neural networks, and for using such networks for neural architecture search.

BACKGROUND

The present disclosure relates to computing solutions. In this regard, conventional solutions, if any existed, for implementing and using neural networks may be costly, cumbersome and inefficient. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for neural architecture search, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which:

FIG. 4 illustrates a flow chart for an example method of neural architecture search.

DETAILED DESCRIPTION

Figure 1:
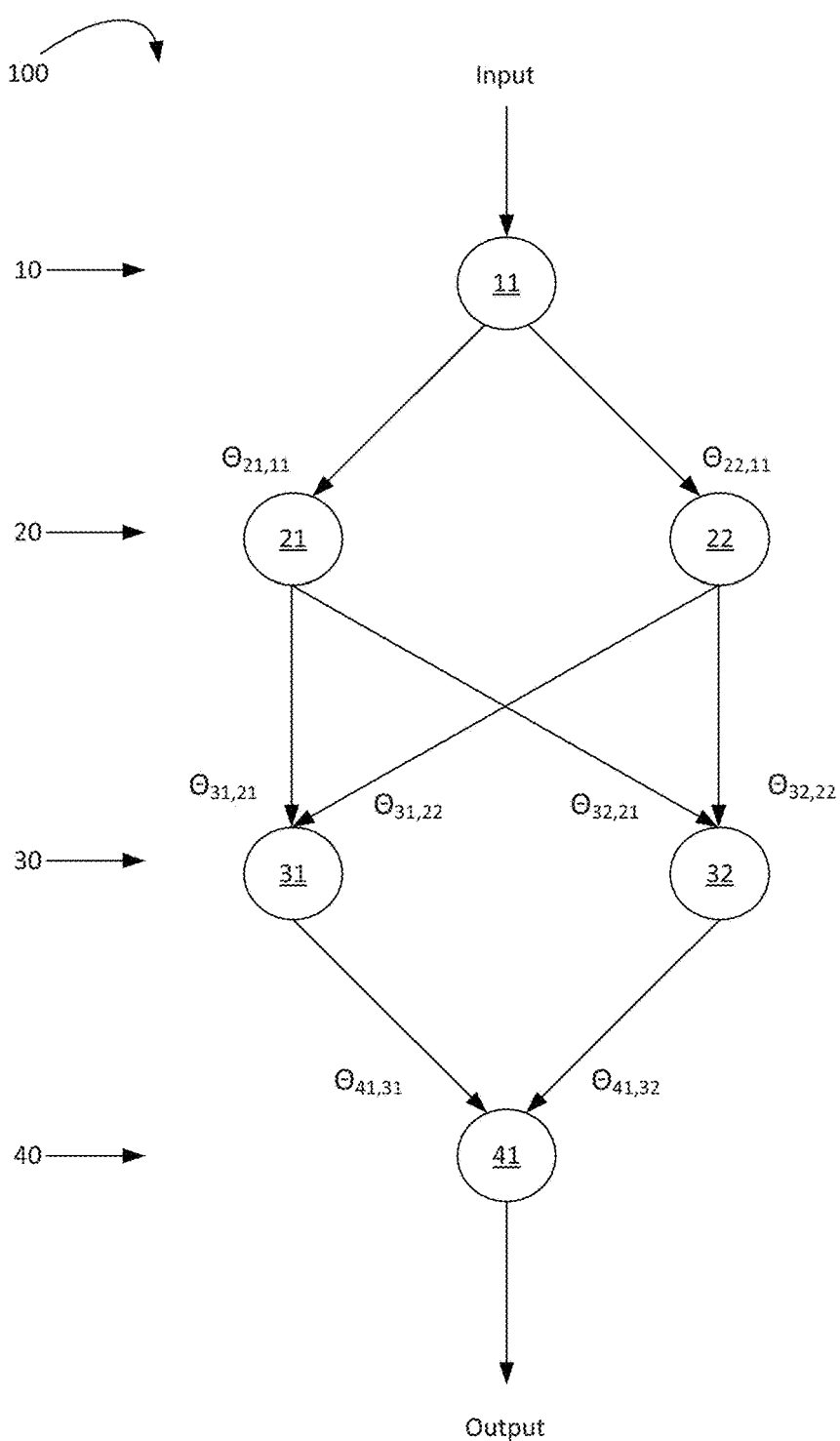
FIG. 1 illustrates a schematic diagram of an example feedforward network.

As utilized herein the terms "circuits" and "circuitry" refer to physical electronic components (e.g., hardware), and any software and/or firmware ("code") that may configure the hardware, be executed by the hardware, and or otherwise be associated with the hardware. As utilized herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Certain example implementations in accordance with the present disclosure may be found in systems and methods for designing neural networks, and for utilizing such networks for neural architecture search, as described in more detail below.

In this regard, through the provision of increased computing power and access to increasingly large quantities of suitable training data, machine learning techniques have found increasing application for providing improved solutions to many technical problems. In particular, use of neural networks has become increasingly common as a way of providing neat and effective solutions to many such technical problems.

Neural networks typically have a structure that includes a plurality of interconnected neurons. Each neuron in the network is arranged to receive input data, which it scales and performs a function on before providing some output data. This output data may then be fed into subsequent neurons as their input data. These subsequent neurons may then also scale this data before performing further functions on it. This process may be repeated for many different neurons before a final output is decided. These networks may be trained by using input data that has a known output corresponding to it, where the training may involve repeatedly operating the network on the data to provide an output and performing a comparison with this output.

In other words, the output for a piece of input data is compared to the known output corresponding to that piece of input data. Weights of the network (which effect the scaling of input data) may then be updated based on the results of this comparison so that the network 'learns' to provide the correct output when provided with a given piece of input data. By repeating this process many times with suitable training data, it has been shown that neural networks may develop great ability to be universal approximators (e.g., they may address the problems they are trained for).

Various types of neural networks may be used. For example, feedforward neural networks comprise a plurality of layers of neurons. In feedforward networks, the output of a neuron in one layer is fed into every neuron in the subsequent layer, so that each neuron receives an input from neurons in their preceding layer. Different configurations of neural networks include recurrent neural networks in which the input for a preceding layer may also be fed into the subsequent layer as input data. Another type of network is a residual network that has a similar arrangement to a simple feedforward network, except that the network may include branches that connect the output from neurons, or layers of neurons, to neurons in layers other than the subsequent layer. Different types of network have been found particularly effective at solving certain types of technical problems. Therefore, when designing a neural network, it may be beneficial to select a type of network based on the problem that network aims to address.

While the selection of the type of neural network may have a significant bearing on the overall ability of the network to perform a selected task, the selection of the type of constituent neurons may also have a significant impact on the ability of a network to perform a selected task. For example, a well-trained network made up of a first selection of neurons may have inferior performance to a less well-trained network with a different, better, selection of neurons. As the training of a network may be very time-consuming, initially selecting suitable neurons may provide a significant reduction in the time, and resources, taken to provide a neural network that performs satisfactorily for a selected task. In addition to increasing the efficiency of training a neural network, the ability to select a suitable configuration of neurons may make the difference between the provision of a neural network that may solve a technical problem, and one that cannot.

Implementations in accordance with the present disclosure may address these and other technical problems, providing methods and system for using neural architecture search to provide neural networks configured to perform selected tasks.

An example method of neural architecture search to provide a neural network configured to perform a selected task, in accordance with the present disclosure, which may be computer-implemented, comprises obtaining a computational graph comprising a plurality of nodes connected by a plurality of edges, with each node and/or edge associated with a corresponding one of a plurality of weightings and being configured to scale input data provided to the each node (e.g., along an edge) according to the corresponding weighting. In this regard, each node may be configured to receive at least one item of input data from a preceding node via an edge connecting the each node to the preceding node, perform an operation on the input data to provide output data, with each item of input data is scaled according to the corresponding weighting associated with the node and/or edge, and provide the output data to a subsequent node via an edge in the graph. The computational graph defines a first candidate model and a second candidate model, where each candidate model is a subgraph in the computational graph. The computational graph has a selection of the plurality of nodes, edges and associated weightings, where some of the selected nodes, edges and weightings are shared between both the first and the second model. For example, the first candidate model and/or the second candidate model may have a selection of nodes, edges and weightings, which are not in the other candidate model, that is, e.g., not all of the nodes, edges and weightings are shared between the two models.

The example method further comprises updating the weightings of the first model based on training the first model to perform the selected task.

The example method further comprises updating the weightings of the second model based on training the second model to perform the same selected task as the first model. In this regard, updating the weightings of the second model comprises updating some of the updated weightings of the first model, which are shared between the first and second models. Updating these shared weightings may be controlled based on an indication of how important to the trained first candidate model the node and/or edge associated with the corresponding weighting is. For example, for weightings associated with a node and/or edge that is not important for the first model, the update to the weighting may be larger than if the associated node/edge were more important to the first model.

The example method further comprises identifying a preferred model for the neural network comprising a selection of nodes, edges and associated weightings from the computational graph. The preferred model is identified based on an analysis of the first and second trained candidate models.

The example method further comprises providing a neural network configured to perform the selected task based on the preferred model.

Implementations in accordance with the present disclosure may enable improved identification of a preferred model for a neural network configured to perform a selected task. Controlling the updates to shared weightings based on an indication of importance may enable, e.g., updates to weightings associated with important features of the first model to be reduced in magnitude. For example, weightings that are less important to the first model may be changed more when training the second model than weightings that are more important to the first model. Then, when identifying the preferred model for the neural network, an analysis of the first and second trained candidate models may be more representative of the model's ability to perform the selected task. For example, the weightings for the first model may have changed less than they otherwise would have done as consequence of sequentially training the first and second candidate models. In turn, this may enable more reliable identification of preferred models as part of the neural architecture search. Consequently, an improved neural network for performing the selected task may be provided.

The neural network configured to perform the selected task may comprise a neural network configured for one or more of: (i) natural language processing, (ii) image recognition, (iii) classification and/or modelling of physical systems, (iv) data processing, and (v) generation of search results. The use of a neural network may find application in any number of technical problems, e.g., they may contribute to any number of technical solutions to technical problems. For example, the network provided by the neural architecture search methods described herein may be operable to process input data and provide an output based on which a technical operation may be controlled.

The indication of importance may be determined based on an indication of information (e.g., Fisher information) for the weighting. The indication of importance may be determined for each shared weighting; it may be determined for all weightings. Controlling the update to the shared weighting based on the indication of importance may comprise scaling a magnitude of the update based on a value for the information for the weighting. For example, the maximum possible change to a given weighting may be limited based on its information. The indication of importance may be implemented in a loss function that is used when training the candidate models.

The indication of importance may be determined based on identifying a loss in performance associated with a node/edge in a candidate model. For example, the indication of importance for a given corresponding weighting may provide an indication of how sensitive performance of the model is to a notional change in the given weighting. A large decrease in performance as a result of a small change to the weighting may indicate that the weighting is very important.

Performance of the model may be represented using a suitable loss function. The indication of importance may be defined as a norm of the gradient of the loss function with respect to the given weighting. Methods may comprise determining the information for each weighting. The information for each weighting may be determined based on a diagonal approximation of a matrix (e.g., a Fisher matrix) for that weighting. Use of information may provide a good indication of the indication of importance associated with a weighting.

Training the second candidate model may comprise using a loss function that includes a component indicative of the information for weightings in the second model. The component may be indicative of the information for the weightings in the first model, e.g., the component indicates how important to the first model (some of) the weightings in the second model are. If more than two candidate models are used, an indication of the information may be used for all other candidate models that have already been trained (in a batch of candidate models being sampled). The loss function used may include a term:

$$\sum_{\theta_i \in \theta_{m_j}} I_{\theta_i}(\theta_i - \hat{\theta}_i)^2$$

where $\theta_i$ represents each weighting, $I_{\theta_i}$ represents the information for weighting $\theta_i$, $m_j$ represents the $j^{th}$ candidate model and $\hat{\theta}_i$ represents the optimal value for that weighting.

The loss function may include a scaling factor configured to inhibit an exploding gradient associated with any of the weightings in the second model. The scaling factor may be indicative of a magnitude for the weighting, for example this may inhibit any change to the weighting that causes it to increase significantly in magnitude. The scaling factor may comprise a norm for the weightings. For example, the scaling factor term may comprise:

$$\sum_{\theta_i \in \theta_{m_j}} \|\theta_i\|^2$$

The loss function may include a term indicative of the cross-entropy loss for the model.

Prior to training of the second model, the weightings of the second model may be initialized based on the trained weightings of the first model. This may reduce the time taken to train each individual model, as the trained weightings that worked well with the first model may also work reasonably well with the second model. For example, they may provide a starting point that is closer to the optimal weightings for the second model than if a random assignment of weights was used.

Identifying the preferred model for the neural network may comprise an analysis of the first and second candidate models using a controller having a policy based on one or both of: (i) reinforcement learning, and (ii) evolutionary learning. The controller may be arranged to perform a reinforcement learning analysis and/or an evolutionary learning analysis on the computational graph. For example, the controller may itself comprise a neural network, such as a recurrent neural network.

The controller may comprise a long short-term memory (LSTM) network. The controller may comprise a number of controller parameters. The controller may operate a policy (e.g., it may perform a selected operation based on functionality set out in the policy). The controller parameters may influence the policy, such that modifying the parameters may modify the outcome of actions taken by the policy. The controller may be trained by updating the controller parameters. For example, a reward may be established which the controller seeks to maximize, e.g., this may be to reduce a variance associated with a baseline average for the controller.

The controller may be trained to suggest candidate models, e.g., from a subset of options of nodes for the model and possible subgraphs. The controller may be updated (or trained) based on presenting the controller with an indication of a preferred model out of a subset of candidate models. Performance of the preferred model may be tested using a validation set. The controller may then be trained to suggest better candidate models by learning which models worked well previously. To train the controller, its policy may be updated by updating values for the controller parameters. The controller may provide a set of suggested candidate models, which may then be sequentially trained before being analyzed to help identify the preferred model. This process may be iterative.

Identifying the preferred model may be an iterative process in which a plurality of candidate models are obtained which are then sequentially trained and then evaluated. Based on an evaluation (e.g., analysis) of the trained models, the controller may be updated. The updated controller may then suggest a subsequent set of candidate models for sequential training and evaluation. This process may be repeated until a preferred model is identified.

For example, identifying the preferred model may comprise: determining which model performs best out of the first and second candidate models based on testing both models using a validation data set; holding the value for the trained weightings constant and updating the policy of the controller based on an analysis of the better performing candidate model; operating the controller with the updated policy to obtain a suggestion for third and fourth candidate models (where some nodes, edges and weightings are shared between both the third and the fourth model); updating the weightings of the third model based on training the third model to perform the selected task; updating the weightings of the fourth model based on training the fourth model to perform the same selected task as the third model; and identifying the preferred model based on an analysis of the third and fourth trained candidate models. In this regard, updating the weightings of the fourth model comprises updating some of the weightings that are shared between the third and fourth models. Further, updating the shared weighting is controlled based on an indication of how important to the trained third candidate model a node and/or edge associated with the weighting is.

Such steps for identifying a preferred model may be repeated with different suggested candidate models until one or both of: (i) a time threshold is reached, and (ii) a difference between a best performing candidate model and a subsequently suggested candidate model is below a threshold difference. For example, a threshold number of epochs may be used, after which point, the preferred model may be established.

Candidate models suggested by the controller may be compared to the last model the controller evaluated. In the event that a degree of similarity between the two models is above a threshold value, the iterative process may stop. The best-performing suggested candidate model from the last iteration of the steps may then be used as the model architecture for the neural network configured to perform the selected task. Providing the neural network may comprise providing a neural network having an architecture corresponding to the subgraph of the best-performing suggested candidate. The weightings for the nodes in the subgraph may be re-trained. For example, re-training may start from the weightings found during the search process or it may start from a set of random weightings. This trained neural network may be provided as the neural network configured to perform the selected task.

The value for the trained weightings may not be held constant. For example, both the policy and the weightings may be updated at the same time. In such examples, the controller may be configured so that updates to the policy and updates to the weightings are independent of one another. For example, updates to the weightings may be based on training using the training data set, and updates to the policy may be based on training the policy using a validation data set.

When a loss function is being minimized, stopping criteria may be introduced. For example, stopping criteria may inhibit a model from being over-trained, e.g., trained too specifically to its training data set that the model struggles to generalize to unseen data. The stopping criteria may include use of a validation data set to identify performance of the model on a separate data set being above a threshold level. For example, stopping criteria may be based on an indication of accuracy for the model, e.g., once above a threshold level, the model may be deemed sufficiently trained.

Each candidate model may be trained multiple times. The first and second candidate model may be trained, then analyzed. Subsequently, both are trained again, before being analyzed again. Subsequent training of both models may comprise updating some of the weightings which are shared between the first and second models, and with updating a the shared weighting is controlled based on an indication of how important to another trained candidate model a node and/or edge associated with the weighting is. After a threshold number of iterations, further candidate models may be suggested, or a preferred candidate model may be identified. For example, each model may be trained over a plurality of epochs.

Obtaining a candidate model may be based on selecting nodes based on: the selected task, and an indication of a performance of the nodes on similar tasks to the selected task. The nodes comprise one or both of: (i) neurons, and (ii) blocks of neurons. For example, if the nodes comprise blocks of neurons, the internal workings of each block of neurons may be held constant during the training of candidate models.

The arrangement (e.g., number/order of/weightings between) blocks may be varied when suggesting and training candidate models. A combination of neurons and blocks of neurons may be used. For example, nodes may be selected so that the model includes nodes that have previously performed well on similar tasks. This may enable a more-reliable convergence on a preferred model.

Operating the controller may comprise use of a reward based on: (i) a component indicative of a goodness of fit for a candidate model, and (ii) a component indicative of complexity of a the candidate model. Two components of the reward for the controller may be separated and/or scaled to prevent the reward being negative.

The weightings may comprise a plurality of matrices that provide numerical weightings for scaling a value of information as it flows through the model. The method may comprise identifying weightings that have a low rate of change in response to training. For example, a second derivative may indicate that a weighting is not changing much (e.g., changes below a threshold level) in response to training, which may indicate that it is close to an optimum value. A gradient associated with a cost function may be monitored for each given weighting. This may indicate a degree of sensitivity of the model on that weighting. Weightings are applied to scale information passing between nodes. Weightings may be applied at one or both of: each node and each edge. Applying weightings at each edge may enable dimensionality to be managed more easily. The weightings may be stored in the edges.

Training and analyzing candidate models may be an iterative process in which first and second candidate models are trained and analyzed multiple times. Initially the training of the second candidate model may occur with each update to a weighting is not based on an indication of how important to the trained first candidate model a node and/or edge associated with the weighting is. The iterative process may then proceed to iterations (e.g., at least one) with updating the weightings is controlled based on an indication of how important to the trained first candidate model a node and/or edge associated with the weighting is. This may reduce any bias towards earlier models that were trained.

In various implementations in accordance with the present disclosure, systems may be provided for implementing neural architecture search to provide a neural network configured to perform selected tasks, as described above for example. In this regard, each such system may comprise suitable circuitry for implementing various aspects of the present disclosure. Such circuitry may comprise, for example, general or dedicated processing circuitry, storage circuitry, communication-related circuitry, etc. In some instances, a network element may be implemented as a single physical apparatus, which may reside centrally in the network. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the different subsystems.

Implementations in accordance with the present disclosure relate to neural architecture search, such as for providing neural networks for performing particular tasks. In this regard, when faced with the job of having to provide a neural network configured to perform a selected task, the neural architecture search is used to identify a preferred model for such a neural network. A preferred model may be identified based on an analysis of multiple candidate models. Identifying a preferred model involves providing a computational graph made up of a plurality of different nodes that are connected by a plurality of edges. The computational graph may be considered to provide a plurality of subgraphs (which may be considered as "candidate models"). Each subgraph is a selection of some of the nodes and edges from the computational graph.

The computational graph comprises a plurality of weightings which scale information as it flows through the network (e.g., between different nodes). Between nodes, a weighting may be applied so that items of input data received at a node may be scaled based on the preceding node from which they have been received.

A plurality of different subgraphs may be identified, and any two of these different subgraphs may both comprise some of the same nodes and weightings. The identified subgraphs represent a subset of all the possible configurations of nodes and edges from the computational graph.

The identified subgraphs are trained sequentially using training data associated with the selected task. Training of a subgraph comprises repeatedly operating the subgraph on items of training data that have a known output associated therewith. For each item of training data, the output from operating the subgraph on that input data is compared to the known output associated with that item of training data.

By comparing the two outputs, the weightings of the subgraph may be modified based on a difference between the two outputs (e.g., so that if the network were to operate on that input data again, it would provide an output corresponding to the known output). This process is repeated a number of times before the subgraph is determined to be "trained", e.g., once there has been a convergence on its ability to perform the selected task.

Once a first subgraph is trained, a second subgraph is then trained in much the same way. However, implementations in accordance with the present disclosure place constraints on how the weightings of the second subgraph may be updated. The first and second subgraphs may have an overlap in their selection of nodes and edges (and thus associated weightings). The weightings that also featured in the first subgraph (hereinafter referred to as "shared weightings") will have already had their values updated and refined based on training the first subgraph to perform the selected task. When the weightings associated with nodes in the second subgraph are updated in response to training, updates to each shared weighting are controlled based on an indication of how important to the first subgraph that shared weighting is.

A plurality of different subgraphs may be trained sequentially. Based on an analysis of the trained subgraphs, a preferred model for the neural network may be identified. In some examples, a controller (e.g., a reinforcement learning controller) may be used to evaluate trained subgraphs and to suggest further subgraphs for sampling based on the results of the evaluation of the trained subgraphs. This process may be iterated until a preferred model has been identified. The preferred model may be any subgraph, e.g., any combination of the nodes and edges (and associated weightings) from the computational graph. A neural network configured to perform the task may be provided based on the preferred model.

Controlling updates to weightings that are important for at least one of the earlier-trained identified subgraphs based on an indication of how important they are to the earlier-trained subgraph may provide less of a time-dependent bias to the neural architecture search. For example, weightings associated with nodes and edges that were important to an earlier-trained subgraph may not have their associated weightings changed as much in response to subsequent training of a different subgraph. Models that made use of such nodes and edges may be very suitable for providing a neural network configured to perform the selected task.

By controlling the updates to weightings associated with such nodes and edges indicated to be important, the earlier-trained models may no longer lose an ability to perform the task as well, despite subsequent models being trained (and thus changes being made to some nodes in the earlier-trained model). Consequently, subsequent analysis of the trained candidate models may be less biased towards the later-trained models. Instead, this may enable earlier-trained models to still be looked upon favorably, if relevant, and so they, e.g., weights that they used and that are shared with the candidate that will be the final one, may feature in a final architecture for the neural network, whereas previously they may have been overlooked, e.g., as a consequence of important weightings being changed. The results of the neural architecture search may therefore provide an improved neural network for performing the selected task.

FIG. 1 illustrates a schematic diagram of an example feed forward network. Shown in FIG. 1 is a schematic of a very simple feedforward neural network 100.

In this regard, the simple feedforward neural network 100 of FIG. 1 is used to provide a simplistic illustration of the teaching of the present disclosure. However, it should be understood present disclosure is not limited to feedforward neural networks (particularly simple examples thereof), and it should be appreciated that implementations in accordance with the present disclosure may be similarly applicable to all forms of neural networks.

The neural network 100 (and other neural networks described hereinafter) may be implemented, and/or the various function and/or operations described hereinafter with respect to utilizing such neural networks may be performed in a system (not shown) that comprises suitable circuitry for implementing various aspects of the present disclosure. Such circuitry may comprise, e.g., general or dedicated processing circuitry, storage circuitry, communication-related circuitry, etc.

In some instance, such system may be implemented as a single physical apparatus, which may reside centrally in a network utilizing the described scheme, and be operated by the network provider. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the elements of each subsystem.

As shown in FIG. 1, the feedforward neural network 100 has four layers: a first layer 10, a second layer 20, a third layer 30 and a fourth layer 40. The first layer 10 comprises one node 11. The second layer 20 comprises two nodes 21 and 22, as does the third layer 30 which has nodes 31 and 32. The fourth layer 40 has a single node 41. Edges which connect different nodes are shown by arrows in FIG. 1.

For example, as shown in FIG. 1, an edge connects node 11 to node 21, and another edge connects node 11 to node 22. The network 100 comprises a plurality of weightings $\theta_{i,j}$, where each $\theta_{i,j}$ represents a scaling factor applied to the input to node i which has been received from the output of node j. At each node a scaling factor is applied to each edge arriving at that node. The weightings may be applied at each edge or at each node. Weightings are referred to hereinafter as being associated with a node, but the disclosure is not so limited. Rather, the weighting associated with a node means that the node will process input data that has been scaled according to that weighting.

The node 11 in the first layer 10 is configured to receive an input. The input may be some form of data that is to be processed by the neural network 100. Processing this data may enable the neural network 100 to provide an output. The output may be based on an analysis of this data, as performed by the neural network 100. The output may provide an indication of the contents of the input data. For example, the input data may comprise a photo, and the output may provide an indication of what is shown in the photo.

The node 11 in the first layer 10 is configured to process the received input data based on a certain functionality specified at this node 11. The node 11 in the first layer 10 is then arranged to provide this processed data to each of the two nodes 21, 22 in the second layer 20. Each of the two nodes 21, 22 in the second layer 20 are configured to then process this data received from the first layer 10 based on certain functionality specified for that node 21, 22 and a scaling factor applied to the processed data output from the node 11 in the first layer 10.

Each of the nodes 21, 22 in the second layer 20 is configured to then output their processed data and provide it to each of the nodes 31, 32 in the third layer 30. Again, each of the two nodes 31, 32 in the third layer 30 are configured to then process this data received from the second layer 20 based on certain functionality specified for that node and a scaling factor applied to this processed data.

As shown in FIG. 1, each of the nodes 31, 32 in the third layer 30 receives input data from two preceding nodes 21, 22 (the nodes in the second layer 20), as opposed to receiving input data from one node. Each of the nodes 31, 32 in the third layer 30 is configured to process their input data and provide their processed output data to the node 41 in the fourth layer 40. The node 41 in the fourth layer 40 is configured to provide an output value based on processing this data received from the third layer 30 based on certain functionality specified for that node 41 and a scaling factor applied to this processed data. In this regard, various types of functionality may be provided by each node in the network 100, and it should understood that the disclosure is not limited to particular type of functionality.

Numerous factors may contribute to the ability of a neural network to perform its selected task. For example, the size and/or depth of a network (e.g., the number of nodes/the number of layers of nodes) will influence the performance of a neural network. With regard to FIG. 1, the performance of the network 100 may, among other factors, depend on the weightings $\theta_{i,j}$ and the functionality applied at each of the nodes in the network 100. Implementations in accordance with the present disclosure may enable an improved selection of the nodes for the network, and thus may enable the provision of an improved neural network for performing the selected task.

When which nodes to select for the network 100 are determined, a computational graph may be constructed. The computational graph comprises a plurality of nodes connected by a plurality of edges. Each node is configured to receive at least one item of input data from a preceding node connected to it via an edge. Each node is arranged to process input data by applying a weighting to the input data and performing an operation on the weighted input data to provide output data. Different nodes may perform different operations, e.g., they may have different functionalities.

The graph comprises a weighting associated with each node for scaling that node's input data. Each node is configured to provide its output data to a subsequent node via an edge in the graph. The computational graph may be considered to define a plurality of candidate models, each candidate model being a subgraph in the computational graph. Each subgraph is made up of a selection from the computational graph of the plurality of nodes and edges, and the weightings associated with the selected nodes. Some of the nodes and their associated weightings are shared between both different subgraphs.

Each candidate model may comprise a fixed, selected arrangement of nodes. The selected architecture (e.g., arrangement of nodes) may vary between different candidate models. The functionality provided at each node may vary between different candidate models. At each of these nodes, a plurality of options for the functionality of that node may be provided. The options for each node may be considered to be represented as a series of candidate nodes clustered together at a selected location in the graph (e.g., in a region where the selected node would be in the final neural network). The computational graph may comprise weightings for connections between each candidate node in a given cluster to each candidate node in a subsequent cluster.

Figure 2:
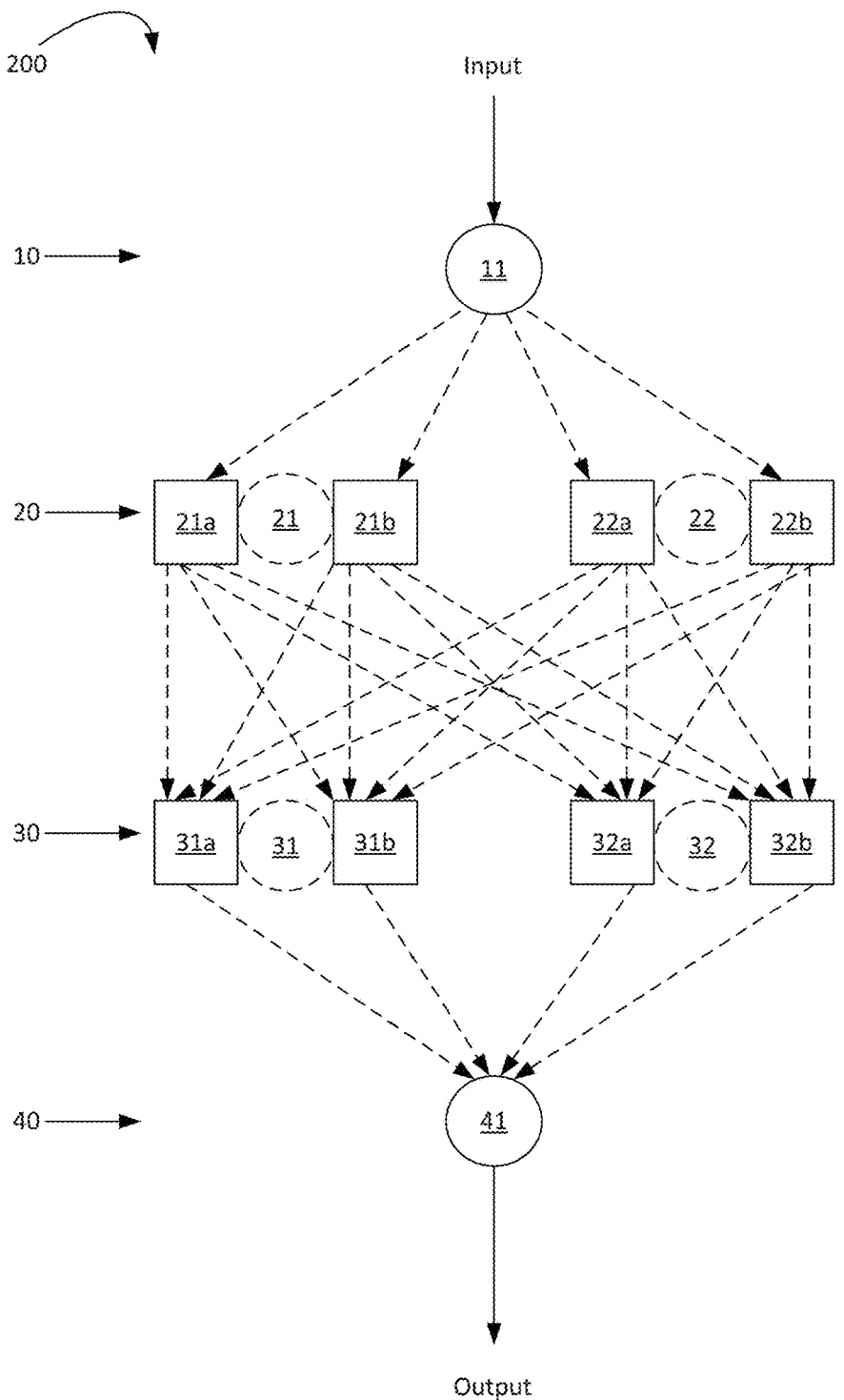
FIG. 2 illustrates a schematic diagram of an example graph including a feedforward network having two possible node options at each node in the second and third layers.

FIG. 2 illustrates a schematic diagram of an example graph including a feed forward network having two possible node options at each node in the second and third layers. Shown in FIG. 2 is a schematic diagram of a functional illustration representing a computational graph 200.

The graph 200 of FIG. 2 corresponds to the neural network 100 shown in FIG. 1 in that it has four layers, with one node per layer for the first and fourth layers, and two nodes per layer for the second and third layers.

As shown in the graph 200 of FIG. 2, two candidate nodes 21a, 21b are provided as candidates for the first node 21 of the second layer 20. Likewise, two candidate nodes 22a, 22b are provided as candidates for the second node 22 of the second layer 20. The same is shown for the third layer 30. Two candidate nodes 31a, 31b are provided as candidates for the first node 31 of the third layer 30, and two candidate nodes 32a, 32b are provided as candidates for the second node 32 of the third layer 30. As illustrated in FIG. 2, the candidate nodes are shown as squares, and the corresponding nodes from FIG. 1 are shown as circles with dashed lines.

The dashed lines of FIG. 2 show possible routes along which information may flow through the network, e.g., all the possible edges. It should be appreciated that some of these will be present in each model, and selection of the ones that will be present will depend on the candidate nodes present in the selected model. In the example use case shown in FIG. 2, each candidate node in the third layer 30 has four possible sources of input from the second layer 20, as does the node 41 in the fourth layer 40. Once a computational graph 200 has been created with candidate models (subgraphs) included, a preferred candidate model may be identified. The preferred candidate model may be a particular subgraph (e.g., a candidate node may have been selected for each node in the network). The particular subgraph may be a combination identified in one of the candidate models, or it may be a new combination of candidate nodes.

To identify the preferred candidate model, each of the candidate models in a subset of subgraphs included in the computational graph is trained. This process may be performed in an iterative fashion. For example, a first candidate model may be trained, then, once the first candidate model is trained (e.g., to a threshold level), a second candidate model may then be trained. This may be repeated, e.g., until a selected number of the candidate models have been trained (e.g., all of the candidate models in the subset). As discussed in more detail below, once the candidate models have been trained, a controller having a trained policy may analyze the computational graph and the trained models to help identify a candidate model to select for the neural network. The controller may be implemented via a suitable circuit in the system implementing the neural network and/or the corresponding neural network search.

It should be appreciated that the schematic diagrams of neural networks described are used for illustration only. For example, for the computational graph 200 shown in FIG. 2, it would be computationally feasible to train and then test all of the possible combinations of subgraphs, and then select the best-performing one as the model on which the neural network will be based. However, neural networks may be much larger than this. As such, analysis of a large neural network having a plurality of different options for each node in that network may hold a near-infinite number of possible configurations. To identify a preferred network from this number of configurations, only a subset of the total number of configurations may be used, otherwise the computational requirements would be unpractical.

Figures 3A, 3B:
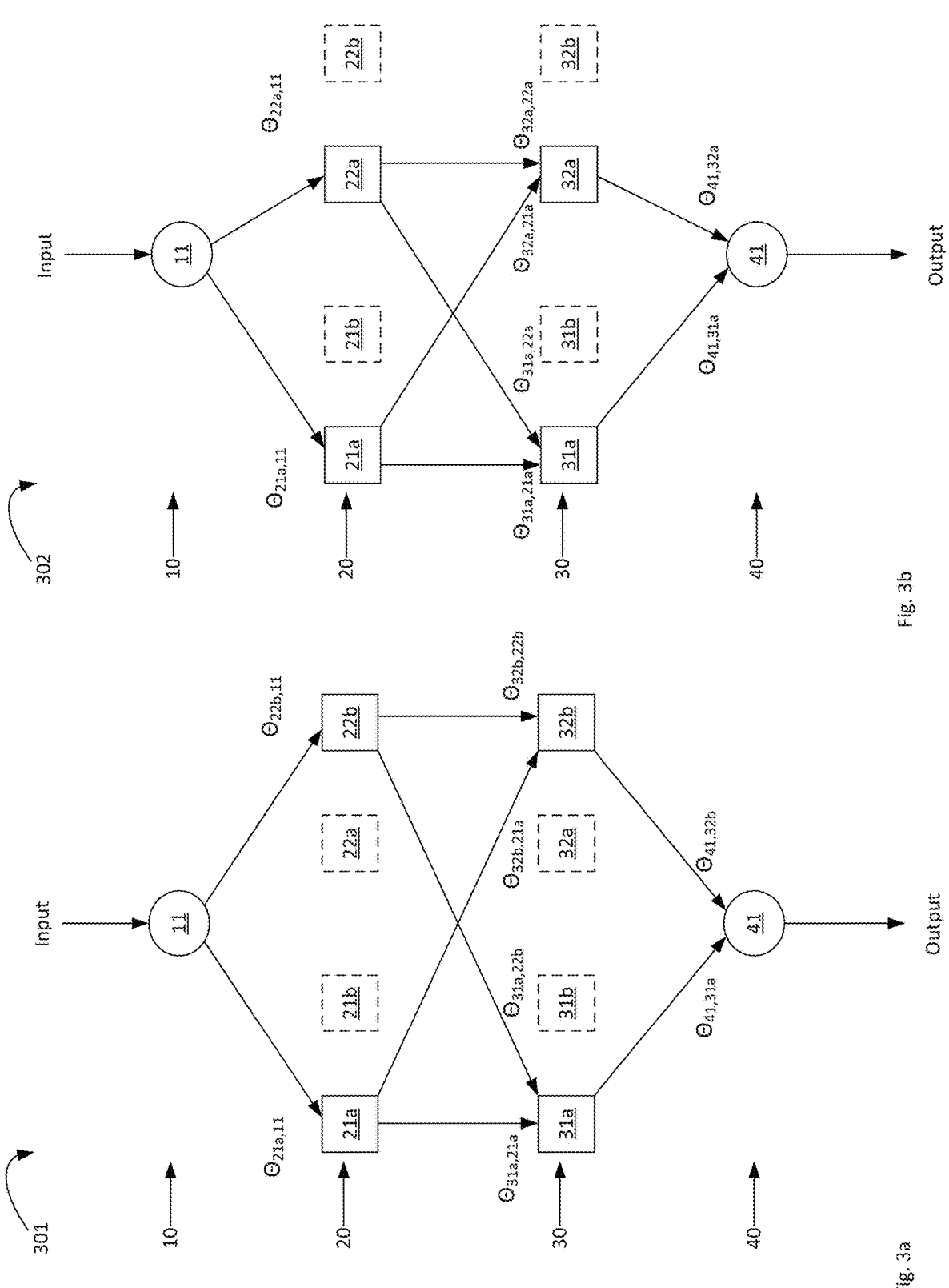
FIGS. 3a and 3b illustrate schematic diagrams of example feedforward network selections from possible node options at a node in an example feedforward network.

FIGS. 3*a* and 3*b* illustrate schematic diagrams of example feedforward network selections from possible node options at a node in an example feedforward network. In this regard, FIGS. 3*a* and 3*b* show two schematic diagrams of candidate models for the neural network. Specifically, shown in FIG. 3*a* is a candidate model 301 in which nodes 21*a*, 22*b*, 31*a* and 32*b* have been selected, and shown in FIG. 3*b* is a candidate model 302 in which nodes 21*a*, 22*a*, 31*a* and 32*a* have been selected. Training of a candidate model is now described with reference to FIGS. 3*a* and 3*b*.

The candidate model has a set of candidate nodes selected and a set of weightings $\theta_{i,j}$ selected. The weightings $\theta_{i,j}$ apply a scaling factor to each node-to-node connection in the model. The scaling factor for each weighting in the model may be "learned" by training the model. The weightings may be learned, e.g., by using gradient-based learning. This involves defining a cost function and minimizing it. Minimizing the cost function may be achieved by following the gradient of the cost function in order to minimize it. Stochastic gradient descent may be used as the optimization procedure. A gradient-descent optimization algorithm may be used which uses backpropagation.

For example, each weighting $\theta_{i,j}$ may be trained according to:

$$\theta_{i,j}^{(t+1)} = \theta_{i,j}^{(t)} - \alpha \nabla J_m\left(\theta_{i,j}^{(t)}\right)$$

where t represents time, $\alpha$ represents a learning rate and $J_m(\theta_{i,j}^{(t)})$ is a cost function computed on a subset of the training data of size m, and $\nabla$ represents a gradient function, e.g., a derivative. The training may be based on a data set $\mathcal{T}_{training} = \{(x_1, y_1) \ldots (x_n, y_n)\}$, with $x_i$ being the $i^{th}$ piece of input data, and $y_i$ the correct output associated with input data $x_i$. At each time step, a stochastic gradient descent algorithm updates the weightings until conversion.

Given a family of density models ($p_{model;\theta}$), conventional neural networks may be trained using a maximum likelihood (e.g., a maximum likelihood function). These density models may represent probability density functions for the models given a particular set of weightings. That is, they are trained to identify so-called "optimum weightings" $\hat{\theta}$ for the network based on, for example:

$$\hat{\theta} = -\operatorname*{argmin}_{\theta} \sum_{i=1}^{n} \log p_{model;\theta}(y_i \mid x_i)$$

Thus, by assuming that $x_i \overset{iid}{\sim} \text{Uniform}(x_1, \ldots x_n)$, and by Bayes' theorem, it may be taken that:

$$p_{model;\theta}(y_i, x_i) = n^{-1} p_{model;\theta}(y_i, x_i)$$

A maximum likelihood estimator may identify the "optimum weightings" by minimizing, such as using:

$$J(\theta) = -\sum_{i=1}^{n} \log p_{model;\theta}(y_i \mid x_i)$$

In in various implementations in accordance with the present disclosure, further constraints may be placed on the training process. For example, a modified loss function may be defined which is used during training. When training each model, the updates to the weightings are calculated based on minimizing this modified loss function. The modified loss function includes a component that takes into account, for a selected weighting, the importance of that weighting in any previously trained models. As different subgraphs may include the same nodes (and their associated weightings), weightings may be trained as part of a later model that have already been trained in relation to an earlier model. This is illustrated in FIGS. 3*a* and 3*b*. These two figures show two possible subgraphs (models) 301, 302 from the computational graph 200 shown in FIG. 2. As shown in FIG. 2, the two subgraphs 301, 302 both comprise nodes 11, 21*a*, 31*a* and 41. As a consequence, the weightings $\theta_{21a,11}$, $\theta_{31a,21a}$ and $\theta_{41,31a}$ are shared by both models (subgraphs 301, 302).

When updating a weighting in a candidate model, the modified loss function may take into account the importance of that weighting (and its associated node) in an earlier-trained model. This may be based on, e.g., an indication of corresponding information (e.g., Fisher information) for that weighting (and node). In this regard, Fisher information may provide an indication of the amount of information the node has for the operation of the model. For a selected weighting, the Fisher information provides an indication of the curvature of the log likelihood for that weighting. A Fisher information matrix may be calculated.

For example, for a selected subgraph (model) to be trained, a cross-entropy loss function $\mathcal{L}_{m_j}$ may be obtained for the subgraph $m_j$. The cross-entropy loss function may be defined so that minimizing the cross-entropy likelihood provides a maximum likelihood for a classification problem. Fisher information for each weighting may be updated sequentially based on the cross-entropy loss function for the subgraph. The update may be based on a derivative of the cross-entropy loss function. For example, a squared gradient of the cross-entropy loss function relative to the selected subgraph may be calculated for each weighting, such as using:

$$\left[\frac{\partial \mathcal{L}_{m_j}}{\partial \theta_i}(\hat{\theta}_{m_j})\right]^2 \text{ for all } \theta_i \in \theta_{m_j}\right).$$

This may then be used to update the Fisher information for each weighting, e.g., The Fisher information for each weighting $(I_{\theta_i})$ may be updated sequentially on $j \in \{1, \ldots, n\}$ as:

$$I_{\theta_i}^{(t+1)} = \begin{cases} I_{\theta_i}^{(t)} + \left[\frac{\partial \mathcal{L}_{m_j}}{\partial \theta_i}(\hat{\theta}_{m_j})\right]^2, & \theta_i \in \theta_{m_j}, \\ I_{\theta_i}^{(t)}, \text{ otherwise} \end{cases}.$$

For all $i \in \{1, \ldots, |\theta|\}$. The update of the Fisher matrix may be calculated using a validation batch after each training of a model, e.g., the updates are determined based on the previously-trained candidate model.

A loss function $\mathcal{L}_{m_j}$ may be defined, e.g., for each architecture (subgraph). This will be referred to hereinafter as a weight plasticity loss function. This loss function may comprise a term indicative of Fisher information, e.g., of Fisher information for each weighting. For example, the loss function may comprise a component which, for each weighting, is based on both: (i) a difference between that weighting's value and an optimum value for that weighting, and (ii) an indication of the Fisher information for that weighting, such as using:

$$\sum_{\theta_i \in \theta_{m_j}} I_{\theta_i}(\theta_i - \hat{\theta}_i)^2$$

Minimizing the weight plasticity loss function may therefore be based at least in part on minimizing this component. The optimal weights $\hat{\theta}_i$ may be overwritten after each training of a model.

The weight plasticity loss function for each weighting may also comprise an indication of the cross-entropy loss function for that subgraph. The weight plasticity loss function may therefore include the two terms:

$$\mathcal{L}_{m_j}(\theta_{m_j}) + \sum_{\theta_i \in \theta_{m_j}} I_{\theta_i}(\theta_i - \hat{\theta}_i)^2$$

Either one or both of these terms may be scaled, e.g., by a respective hyperparameter. Such hyperparameters may be learned. They may be controlled to provide a selected learning rate for the equation.

When each of the candidate models is trained, the weight plasticity loss function may be minimized. This may have the effect of reducing a magnitude of updates to weightings in a candidate model that are important to other candidate models. The weight plasticity loss function balances this minimizing of changes to important weightings with a minimizing of the performance at performing the selected task for each model, so that high performance for the task for each model may still be obtained without sacrificing performance on that same task in earlier trained models.

The weight plasticity loss function may comprise a term indicative of a modulus of each weighting. For example, this may be based on a value for the modulus squared, e.g., the weight plasticity loss function may comprise the term:

$$\sum_{\theta_i \in \theta_{m_j}} \|\theta_i\|^2$$

This may act to enforce lower weights across the subgraph, which may provide improved performance for providing a neural network configured to perform the selected task. A weight plasticity loss function for each subgraph $m_j$ may be defined as:

$$\mathcal{L}_{WPL_{m_j}} = \mathcal{L}_{m_j}(\theta_{m_j}) + \sum_{\theta_i \in \theta_{m_j}} I_{\theta_i}(\theta_i - \hat{\theta}_i)^2 + \sum_{\theta_i \in \theta_{m_j}} \|\theta_i\|^2$$

Training of each subgraph may be based on minimizing this function when updating the weightings of that subgraph. For example, each of the three components may be scaled according to a hyperparameter to control their relative contributions. Values for these hyperparameters may be learned.

Updates to the Fisher information matrix may be clipped. For example, the updates may be scaled back based on a selected threshold for updates. This may help inhibit exploding gradients associated with the loss function. For example, each update may be scaled based on a value for its respective weighting. The update to the Fisher information matrix may be scaled based on the norm for each weighting matrix. For example, the updates of the Fisher information matrix may be clipped by the norm for each weight matrix as per:

$$I_w^{(t+1)} = \begin{cases} \alpha I_w^{(t)}, & \|I_w^{(t)}\| \le \beta, \\ \alpha \frac{I_w^{(t)}}{\|I_w^{(t)}\|}, & \text{otherwise}. \end{cases}$$

The parameters $\alpha$ and $\beta$ may be tuned, e.g., they may be learned. These parameters may provide a degree of constraint for controlling the learning of the models.

Once the weightings for each of the candidate models have been updated based on training, an analysis of the candidate models may be performed. The analysis may comprise sequentially evaluating performance of the different candidate models using a validation set, e.g., a data set different to the training data set from which the performance of the model at performing the selected task (on unseen data) may be determined. The top performing model may be selected. In some examples, the top performing model may be taken as the preferred model, and a neural network may be provided which is based on this preferred model. Providing the neural network may comprise creating a neural network using the preferred model and a random set of weightings, then training the network.

Another example is shown in FIG. 4 in which an iterative approach is used which enables a controller to evaluate trained candidate models that have performed well, and to learn from these, and based on this, to suggest candidate models to train and evaluate.

FIG. 4 illustrates a flow chart for an example method of neural architecture search. Shown in FIG. 4 is a method 400 for providing a neural network configured to perform the selected task.

At step 410, a computational graph is obtained, e.g., as described above.

At step 420, a set of suggested subgraphs is obtained. This set of subgraphs may initially be selected randomly. However, as the loop iterates, the subgraphs may be selected by the controller. The disclosure is not so limited, however. For example, the subgraphs may also initially be selected by the controller.

At step 430, each of the subgraphs is trained in an iterative fashion, as described above. That is, the training uses training data and minimizes a weight plasticity loss function so that updates to weightings of each candidate model are controlled—e.g., based on how important those weightings are to other previously trained candidate models.

At step 440, the subgraphs are evaluated, e.g., using validation data sets. In this regard, at this stage, each of the candidate models has been trained. They may have been given a limited amount of training time, e.g., only a small number of batches. Each candidate may therefore be better than it was before, but not fully trained. A time threshold or batch threshold may be used to control the amount of training each model receives. The models are then tested on a validation data set so that a best candidate model may be identified. The best candidate model may then be evaluated (e.g., by a controller). In this regard, the controller may use reinforcement or evolutionary learning algorithms to update parameters of its policy based on results from the validation data for the best candidate model.

For example, the controller may use a reinforcement learning algorithm. Reinforcement learning uses a trial and error process guided by an agent. The agent may interact with its environment in discrete or continuous time. At each time, a state $S_t=s$ is received from the environment, from which the agent produces an action $A_t=a$. The choice of this action is done by the policy $\pi_{\theta_p}(a|s)$ of the controller, which is a probability distribution over the state of actions. After, the agent receives a new state $S_{t+1}$ and a reward $R_{t+1}$. The objective may be to maximize some form of future reward. In this regard, reinforcement learning comprises changing the policy in response to a received reward and aiming to maximize a future reward. In order to do so, the reinforcement learning algorithm may address an exploration-exploitation trade off.

For example, bandit algorithms may be used. In the context of neural architecture search, this may comprise identifying new, untested combinations/selections of nodes that have unknown performance capabilities, and sticking to known combinations/selections of nodes while making small changes to the combination/selection. Parameters for the policy of the controller may be learned using policy gradient methods, e.g., methods based on a gradient of a loss function.

Policy gradient methods may be used in combination with a recurrent policy adapted to neural architecture search. An architecture (e.g., a subgraph) may be defined by a sequence of T actions $a_1, \ldots, a_T$. Each action may define an operation (e.g., the functionality of a node), such as a rectified linear unit (ReLU) or softmax function. Each action may define an indication of how to compose an operation (e.g., defining the input of operations). The policy (e.g., a recurrent neural network policy) may be configured to produce actions $a_i$ sequentially until reaching action $a_T$, which denotes completion of the architecture. The state $S_T$ may be considered the hidden state of the neural network. The policy may be defined as:

$$\pi_{\theta_p}(a_t \mid s_t) = \pi_{\theta_p}(a_t \mid a_{1,\ldots,t-1}) = \mathbb{P}_{\theta_p}(a_t \mid a_{1,\ldots,t-1})$$

This may be a stochastic policy where actions may be sampled according to a probability distribution over the space of all possible actions. The aim is to maximize the expected reward $L(\theta_p)$ over our policy, where:

$$L(\theta_p) = \sum_{a_1,\ldots,T \in D} \pi_{\theta_p}(a_1, \ldots, T)R(a_1, \ldots, T)$$

where D defines the set of all possible architectures (subgraphs), while $\pi_{\theta_p}(a_1, \ldots, T)$ is the probability of sampling the architecture $a_1, \ldots, T$ and $R(a_1, \ldots, T)$ is the inverse of the validation perplexity of the sampled architecture $a_1, \ldots, T$.

Using the assumption that the policy is differentiable with regard to its parameters $\theta_p$, the aim is to find the parameters of the policy in order to maximize $L(\theta_p)$ by following the gradient:

$$\nabla L(\theta_p) = \sum_{a_1,\ldots,T \in D} \nabla \pi_{\theta_p}(a_1, \ldots, T)R(a_1, \ldots, T) =$$

$$\sum_{a_1,\ldots,T \in D} \pi_{\theta_p}(a_1, \ldots, T)R(a_1, \ldots, T)\nabla \log \pi_{\theta_p}(a_1, \ldots, T) =$$

$$\mathbb{E}_{a_1,\ldots T \sim \pi_{\theta_p}}\left[\nabla \log \pi_{\theta_p}(a_1, \ldots, T)R(a_1, \ldots, T)\right]$$

Practically, this may comprise calculating $\pi_{\theta_p}(a_1, \ldots, T)$ as:

$$\pi_{\theta_p}(a_1, \ldots, T) = \pi_{\theta_p}(m) = \mathbb{P}_{\theta_p}(a_1)\mathbb{P}_{\theta_p}(a_2 \mid a_1) \ldots \mathbb{P}_{\theta_p}(a_T \mid a_1, \ldots, a_{T-1})$$

The gradient may be computed using, e.g., a Monte Carlo estimate, which is unbiased. A stochastic gradient descent may be used to update the parameters $\theta_p$, e.g., such as using:

$$\theta_p^{(t+1)} = \theta_p^{(t)} + \alpha \nabla L(\theta_p^{(t)})$$

In an example implementation, the REINFORCE algorithm may be used. A Boltzmann softmax equation may be used which divides exponentials in the original softmax by a temperature T which decays over time. This temperature (and its decay) may be used to initially favor exploration (e.g., as opposed to exploitation).

When the reward for the policy is calculated, a validation set (different to the training data set used for updating the weightings) may be used. This may enable the policy to select models that generalize well (rather than ones that are too specialized/overfitted to the training data set). For example, the perplexity may be calculated on a validation data set (or a minibatch thereof).

At step 450, the policy of the controller may be updated. This may be based on the approach described above. The updated policy may then be used to select different subgraphs/identify different subgraphs that may be considered, based on the updated policy, to be better. The controller may be configured to suggest further subgraphs which may be considered by the controller to be, as determined based on its updated policy, suitable for performing the selected task.

At step 460, the controller may be operated to use the updated policy to suggest subgraphs for the selected task. For example, it may select a set of actions corresponding to a sequence of operations for the subgraph. A plurality of such subgraphs may be selected by the controller. These may then form the candidate models for the next round of testing subgraphs.

In some instances, the controller may not suggest subgraphs. In this regard, steps 420 to 470 may be performed (and looped) without suggesting new subgraphs so that the candidate models obtained at step 420 are trained for several iterations. During each iteration of training these candidate models, the policy may still be updated based on the evaluation of the trained models. In some instances, the controller may not suggest subgraphs, but may still provide an indication of which of a selection of trained subgraphs is the preferred subgraph. For example, step 460 may be skipped.

At step 470, it may be determined whether or not to iterate (e.g., repeat steps 420 to 460). If at step 470, it is determined that iteration should stop, the method proceeds to step 480; otherwise, the method loops back (e.g., to step 420).

The subgraphs suggested by the controller may be examined when making the determination, and different criteria may be used in determining whether or not to keep iterating. The suggested subgraphs may be used in step 420 as the obtained set of subgraphs, and steps 420 to 460 may be repeated using these newly-suggested candidate models. By iterating this process, the method may get closer to obtaining a preferred model for performing the selected task.

Criteria may be applied to determine whether a suggested subgraph, or the best subgraph from the previous set of candidate models, should be used as the preferred model that the neural network will use for performing the selected task. For example, a comparison may be made between a suggested candidate model and the previous best candidate model. If the two are functionally very similar, e.g., have an architectural degree of similarity above a threshold level/contain a threshold number of the same neurons (e.g., in the same location in the network), it may be determined that the suggested model/the previous best model should be taken as the preferred model. If the controller suggests a plurality of different subgraphs, a comparison may be performed to see if any of these have been previously suggested by the controller.

In the event that a threshold number of suggested subgraphs are the same as previous candidate models, it may be determined that no meaningful changes have occurred, and the threshold may be determined to have been reached. Additionally and/or alternatively, a threshold time limit, or threshold number of iterations may be applied, and once this threshold is reached, the method may stop iterating.

At step 480, a neural network is created based on the subgraph in the preferred model.

At step 490, the created neural network is trained so that the weightings are updated to convergence, e.g., starting from a random initialization. The network is then provided as the selected neural network for performing the selected task.

FIGS. 5*a*, 5*b*, and 6*a* to 6*f* illustrate results obtained using example use cases using methods and/or systems implemented in accordance with the present disclosure, such as using the methods described herein.

Figures 5A, 5B:
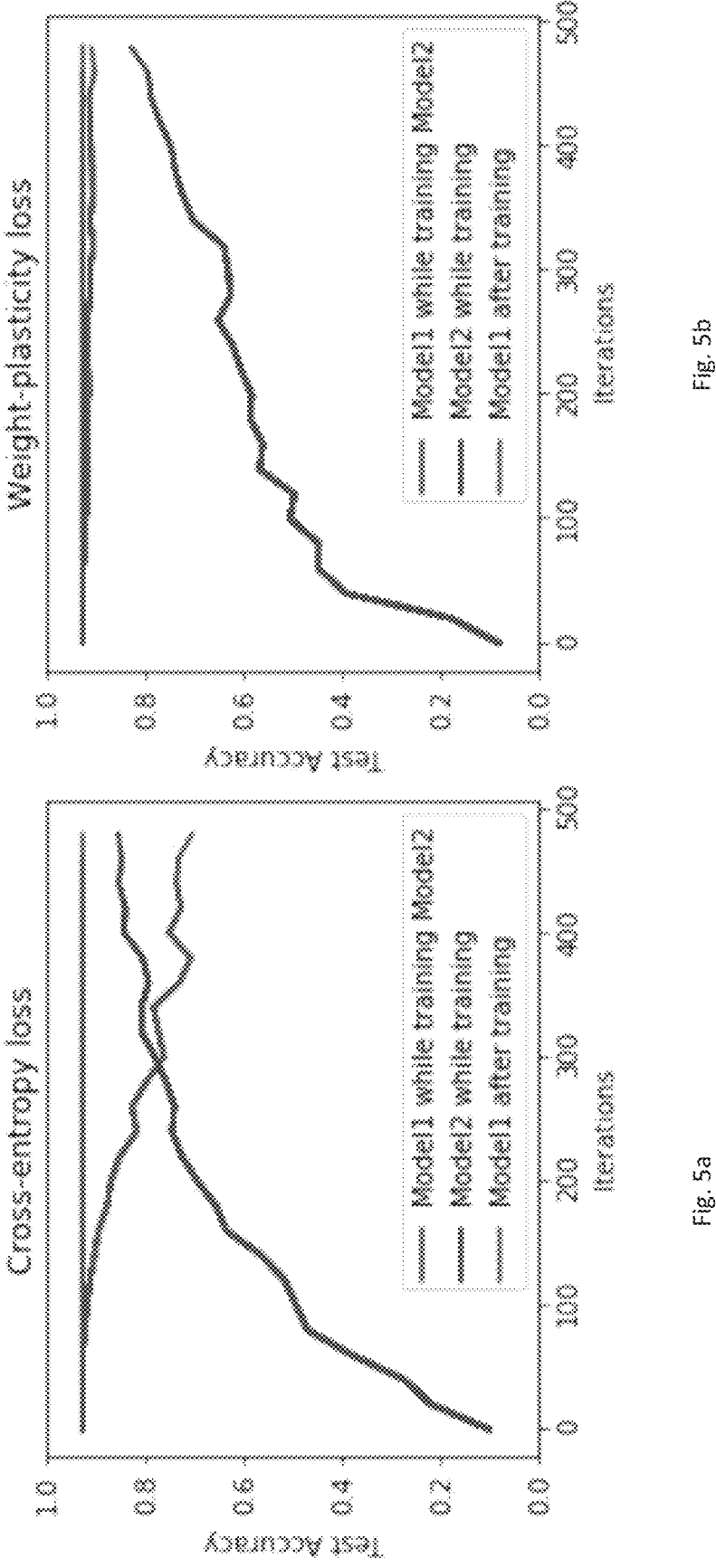
FIGS. 5a and 5b illustrate a comparison between results obtained using a conventional cross-entropy loss system and using a weight-plasticity loss system of the present disclosure.

FIGS. 5*a* and 5*b* illustrate a comparison between results obtained using a conventional cross-entropy loss system and using a weight-plasticity loss system of the present disclosure. Shown in FIGS. 5*a* and 5*b* are results for test accuracy when sequentially training two models.

As shown in FIGS. 5*a* and 5*b*, the two models may be tested on the hand digit recognition dataset (e.g., from the Modified National Institute of Standards and Technology (MNIST) database). The two models are simple feedforward networks, with model 1 having 4 layers and model 2 having 6 layers. In both cases, the first model was trained until convergence, thus obtaining $(\hat{\theta}_1, \hat{\theta}_s)$, which are the optimum weightings for model 1. The optimum weightings for model 1 comprise some weightings that are shared with model 2. Model 2 is then trained on the same data set as model 1. Training model 2 comprises updating the shared weightings. FIGS. 5*a* and 5*b* illustrate how the test accuracy for these two models varies depending on the loss function used when training the models.

FIG. 5*a* shows results when two models are sequentially training using a cross-entropy loss function, e.g., training by maximum likelihood of obtaining optimum weightings. The green line 511 (which goes from top left to top right) shows the performance of model 1 after training. This is a flat line, which shows the performance achieved by model 1 remains at a test accuracy of approximately 92%. This line shows the performance of model 1 as a baseline. The blue line 513 (which goes from bottom left to top right) shows the test accuracy of model 2 while this model is being trained. As expected, the test accuracy of model 2 increases with increased training. It may be seen that model 2 does not quite reach convergence over the number of iterations shown, but that a substantial increase in the ability of model 2 to perform the task has been observed. The red line 515 (which goes from top left to middle right) shows how the test accuracy of model 1 is affected by the training of model 2 (and thus updating of weightings shared between the two models).

As shown in FIG. 5*a*, as model 2 is trained (and the shared weightings are changed) the performance of model 1 decreases. It is apparent from FIG. 5*a* that the drop in performance of model 1 is substantial, and so any subsequent analysis of model 1 would suggest that model 1 does not perform as well as it is capable of performing. As shown in FIG. 5*a*, over 500 iterations in training, the test accuracy of model 1 dropped almost 30%.

FIG. 5*b* shows results when sequentially training two models using a weight plasticity loss function:

$$\mathcal{L}_{WPL_{m_j}}(\theta_2, \theta_s) = \mathcal{L}_2(\theta_2, \theta_s) + \frac{\alpha}{2} \sum_{\theta_{s_i} \in \theta_s} I_{\theta_{s_i}} \left( \theta_{s_i} - \hat{\theta}_{s_i} \right)^2 + \frac{\lambda}{2} \sum_{\theta_{s_{2_i}} \in \theta_s, \theta_2} \left\| \theta_{s_{2_i}} \right\|^2$$

where $\theta_s$ are shared weightings between models 1 and 2, and $I_{\theta_{s_i}}$ is the diagonal element of the corresponding weighting shared from the Fisher approximation obtained from the first fit of the first subgraph (model 1).

The lines represent the same indicators as in FIG. 5a. As shown in FIG. 5a, the performance of model 1 after training and the performance of model 2 during training are roughly the same as in FIG. 5a. The main difference is the test accuracy for model 1 while model 2 is trained. As shown in FIG. 5a, there may be only a minor change in the test accuracy for model 1 as a consequence of sequentially training model 2. The second optimization (e.g., the training of model 2) predominantly modifies weightings that have low Fisher information. These are considered to be less important for the first model (e.g., because the Fisher information indicates the curvature of the log likelihood with regard to each particular weighting).

Training model 2 using a loss function based on how important to model 1 the nodes and/or edges associated with a weighting are, enables performance of model 1 to be retained during training of a subsequent model. By a comparison of FIGS. 5a and 5b, it may be seen that an analysis of model 1 and model 2 at iteration 500 of training model 2 would provide a different indication of which the model with the higher test accuracy. By training using the weight-plasticity loss function, test accuracy of model 1 is preserved while model 2 is trained.

FIGS. 6a-6f illustrate a comparison between results obtained using a conventional cross-entropy loss system and using a weight-plasticity loss system of the present disclosure. Shown in FIGS. 6a to 6f is further comparative data between use of a weight-plasticity loss function and a cross-entropy loss function. In this regard, the comparative data in these figures is based on the weight-plasticity loss function:

$$\mathcal{L}_{WPL_{m_j}} = \mathcal{L}_{m_j}(\theta_{m_j}) + \sum_{\theta_i \in \theta_{m_j}} I_{\theta_i}(\theta_i - \hat{\theta}_i)^2 + \sum_{\theta_i \in \theta_{m_j}} \|\theta_i\|^2$$

The Fisher information for each weighting was updated as per:

$$I_{\theta_i}^{(t+1)} = \begin{cases} I_{\theta_i}^{(t)} + \left[\frac{\partial \mathcal{L}_{m_j}}{\partial \theta_i}(\hat{\theta}_{m_j})\right]^2, & \theta_i \in \theta_{m_j}, \\ I_{\theta_i}^{(t)}, & \text{otherwise.} \end{cases}$$

With the updates to the Fisher information being clipped as per:

$$I_w^{(t+1)} = \begin{cases} \alpha I_w^{(t)}, & \|I_w^{(t)}\| \le \beta, \\ \alpha \frac{I_w^{(t)}}{\|I_w^{(t)}\|}, & \text{otherwise.} \end{cases}$$

Figure 6A:
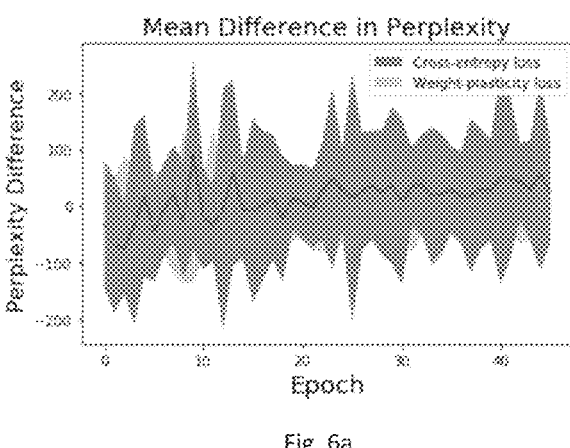
FIGS. 6a-6f illustrate a comparison between results obtained using a conventional cross-entropy loss system and using a weight-plasticity loss system of the present disclosure.
Figure 6B:
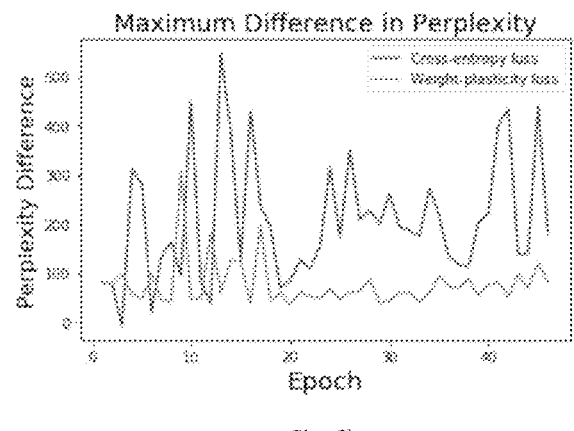

In the example use case(s) illustrated in FIGS. 6a and 6b, values for $\alpha$ and $\beta$ are set to 1 and a 100 respectively, with 50 models being sampled per epoch, with 10 batches per epoch. For the use of the weight-plasticity loss function, the weight-plasticity loss function was introduced at the third epoch, and the Fisher information was set to zero at each epoch. For the use of the cross-entropy loss function, a cross-entropy loss function was used throughout. Increasing the value of $\beta$ places a larger constraint (e.g., penalty) on previously learned weightings.

FIG. 6a shows mean difference in perplexity, for each trained model, between performances of: (i) that model after the sequential training of all of the 50 models, and (ii) that model when trained independently. This difference is shown over 50 epochs. Perplexity provides an indication of how well a model predicts a sample—a low perplexity indicates that the model predicts well. FIG. 6a also shows error bars for ±2 standard deviations. As shown in FIG. 6a, the use of weight-plasticity loss function (as shown by the lower of the two lines at the right-hand end, and the narrower of the two error bars) reduces the mean difference in perplexity between a model that has been sequentially trained and a model that has been independently trained. This is clearly beneficial. It means that models used for updating a policy of the controller are more reliably the correct choice (e.g., the selection of a best candidate model is less likely to have been skewed by the location in the sequence at which that model was trained).

FIG. 6b shows the maximum difference in perplexity between performances of: (i) models after the sequential training of all of the 50 models, and (ii) corresponding models when trained independently. Again, the weight-plasticity loss function provides a substantial reduction in the maximum difference in perplexity. Further, the fluctuations in this value are lower for the weight-plasticity loss function. This shows another clear benefit of using the weight-plasticity loss function.

In the example use case(s) illustrated in FIGS. 6c to 6f show values for $\alpha$ and $\beta$ were set to 70 and 10 respectively, with 70 models per epoch, with each model being trained for 15 batches. For the weight-plasticity model, updates to the weightings are based on the weight-plasticity loss function at the eighth epoch, with the Fisher information matrix set to zero at each three epochs. For each loss function, 2000 steps per epoch are used to train the policy and the policy is not held fixed. Reinforcement learning REINFORCE algorithm is used as part of the controller with a policy to be determined.

Figure 6C:
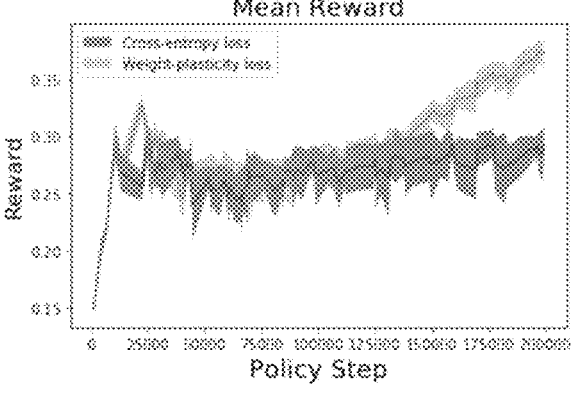

FIG. 6c shows the mean reward for the models plotted against the number of policy steps taken. The policy is designed to maximize the reward based on the candidate models, so a higher value for the reward is beneficial. As shown in FIG. 6c, the mean reward when using the weight-plasticity loss function is substantially higher than when using the cross-entropy loss function. The error bars shown represent 0.5 standard deviations. It may be seen that the mean reward is much higher for the weight-plasticity loss function and the standard deviation of this reward is much lower.

Figure 6D:
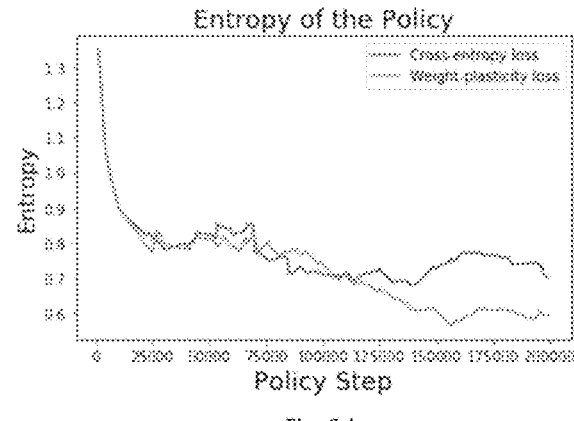

FIG. 6d shows the entropy for the policy. The entropy of a policy provides a measure of the uncertainty of the probability distribution of the predictions made by the policy—the higher the entropy, the higher the uncertainty. As shown in FIG. 6d, the entropy of the policy obtained using the weight-plasticity loss function is substantially less than that obtained using the cross-entropy loss function. Thus, use of the weight-plasticity loss function may provide a more reliable neural network for performing a selected task.

Figure 6E:
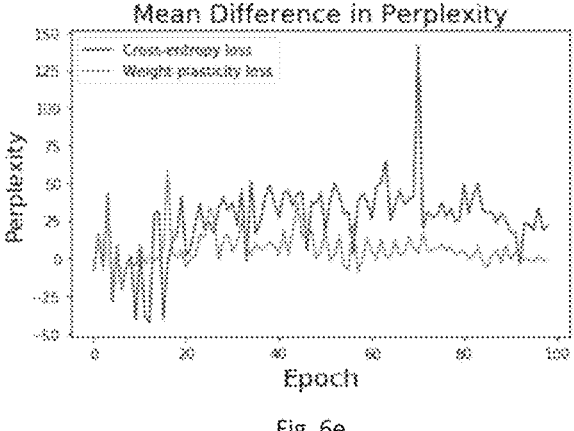
Figure 6F:
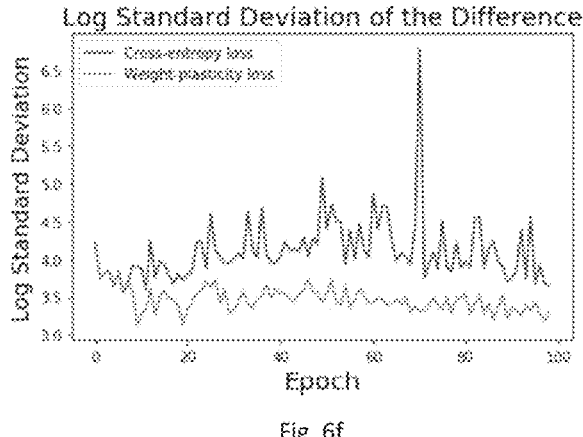

FIGS. 6e and 6f show similar trends as FIGS. 6a and 6b in that when comparing models trained as part of a sequence using the weight-plasticity loss function to corresponding models trained independently, the mean and standard deviation of this difference over a number of candidate models is substantially lower than when using a cross-entropy loss function. Additionally, it is very apparent from FIGS. 6e and 6f that the use of the weight-entropy loss function is responsible for this increase in performance. As mentioned above, the weight-plasticity loss function was only introduced at the eighth epoch. Before this point, the two loss functions were identical. As shown in FIGS. 6e and 6f, the improvement in performance of the weight-plasticity loss function occurs after the eighth epoch. Prior to this, the two loss functions perform the same.

As described herein, implementations in accordance with the present disclosure make references to nodes of the neural network. The functionality (e.g., activation functions) used in such neural network is not limited, and may include any suitable available functions. Such functions may include rectified linear unit (ReLU) function, hyperbolic tangent (Tanh) function, sigmoid function, softmax function, etc. In particular, non-linear functions are used frequently. These functions may be used for individual neurons in a network. Implementations in accordance with the present disclosure encompass each individual node (as described herein) being either an individual neuron or a block of neurons. The computational graph may comprise combinations of both.

In various implementations in accordance with the present disclosure, blocks of neurons may be utilized at nodes. Each block of neurons may its own set topography and contents. For example, a block may comprise a sequence of selected neurons connected by a selected set of edges, with fixed weightings associated therewith. Use of blocks of neurons may improve the neural architecture search as blocks may be selected based on previous knowledge of how those blocks perform on similar tasks. This may also reduce the number of weightings that need to be trained as part of the method because the weightings within a block may be held fixed. The neural architecture search methods may only then need to identify the edges and weightings between different blocks, e.g., between fewer features than if the blocks were expanded out and edges/weightings were needed for every neuron.

Such example implementations may be referred to as neural architecture search with blocks. A controller may be used (e.g., with a LTSM policy) which samples blocks at nodes and determine edges at which to connect them. In some instances, the internal weightings for a block may not be held fixed, e.g., instead only the component neurons are selected, but the weightings between them may be edited during training. In such instances, if two candidate models shared the same block, they may share a large number of weightings (e.g., all the weightings in the blocks which they share). Thus, use of weight plasticity loss functions may find particular application in such scenarios.

A reward to be maximized by the controller may be modified to comprise a component that takes into account complexity of a candidate model. For example, the reward may be based on the number of components within a candidate model. This may be in addition to the reward being based on a goodness of fit for a candidate model, e.g., a validation perplexity for the model. Introducing a component based on complexity of a candidate model into the reward function may be applicable to all methods described herein.

For example, a density based reward may be introduced. The reward may be configured to favor models with fewer weightings. The density of a model may be defined as:

$$D = \frac{|\theta_{model}|}{|\theta_{maximum}|}$$

where $\theta_{maximum}$ is the maximum possible number of weightings to be included in the model.

The reward may be based on this density, such as using:

$$R_w = \frac{a}{\text{valid}_{ppl}} - b\log(D)$$

where a and b are hyperparameters to be learned, and $\text{valid}_{ppl}$ is the validation perplexity, e.g., how well a model performs on a validation data set. The two components of the reward may be separated (as shown) to prevent the reward from turning negative. Use of this reward may therefore identify models which perform well and which have fewer weightings.

Some example implementations described herein include use of iterative processes where candidate models are trained numerous times before a preferred model is selected. In some examples, the same set of candidate models may be trained a number of times, e.g., they may be trained on a number of different batches. Where a controller is used to evaluate candidate models and update its policy for identifying preferred candidate models, the iterative process may comprise multiple repetitions of training a set of candidate models and then evaluating the same models using the controller to update the policy, before re-training the same models and then re-evaluating them with the controller.

In some examples, the controller may suggest new candidate models for testing in response to having updated the policy based on a set of trained candidate models. However, in some examples, the iterative process may not be needed. For example, a single operation of sequentially training of candidate models may be enough for a preferred model to be identified. As some example implementations described herein enable sequentially trained models to be trained so that any updated weightings reduce the detriment to earlier-trained models, one run of sequentially training these models may still be enough for a preferred model to be identified.

As used herein, the terms "subgraph" and "model" may be used interchangeably. Obtaining a computational graph may be considered to be obtaining data indicative of a computational graph, such as an array of matrices and operations for controlling and scaling the flow of information between different functions. One particular subgraph (e.g., collection of nodes, connected by edges with weightings included) may be considered a candidate model. If the candidate model is determined to be a preferred candidate model, then the particular architecture of the subgraph may be used as the architecture for the neural network (e.g., without the presence of the other nodes and edges in the computational graph).

The selected task may be any of a number of selected tasks. Neural networks may find application in a wide range of technical problems. For example, selected tasks include: (i) natural language processing, (ii) image recognition, (iii) classification and/or modelling of physical systems, (iv) data processing and (v) generation of search results. This list is not to be considered as limiting, however, as any instance in which input data may be processed to provide output data, based on which technical operations may be carried out, may benefit from use of an improved neural network for processing the data.

It should be appreciated that the present disclosure is not linked to the provision of any particular type of neural network. It applies to any network where weightings are used which may be shared amongst different nodes in a computational graph as part of a neural architecture search for that type of network. For example, suitable neural networks may include convolutional neural networks, deep residual neural networks, capsule networks, recurrent neural networks, multi-layer perceptrons, etc.

Neural networks disclosed herein (e.g., those for performing a selected task) may include recurrent neural networks used for encoders in sequence to sequence models which are of particular importance. These may find application in, e.g., translation, churn detection and email classification. For example, improved translation neural networks may be able to identify key phrases in a sentence that are to be translated. This may enable neural networks that may receive input data in the form of a string of text in a first language or coding, process this input data to provide output data in the form of a string of text in a different language or coding. In other examples, neural networks may find application in image recognition systems. For example, at security checkpoints, e.g., airports, a camera may capture an image of an individual, and the neural network may be arranged to classify/identify the individual. Improved neural network architectures may improve the ability of these neural networks to identify individuals in photos.

It should be appreciated that any suitable type of controller/policy may be used during the analysis of trained candidate models. While use of reinforcement learning has been described, other examples could be used. For example, evolutionary networks (and associated neuroevolutionary methods) may be used. In such examples, both the topology of the network and its weightings may be updated during training (e.g., the network architecture may evolve). Weightings may also be inherited by child nodes in a controlled manner, so that parental weightings may be applied to a child node where suitable.

It should be appreciated that the implementations shown and/or described are example implementations, and include features that may be generalized, removed or replaced as described herein and as set out in the claims. With reference to the drawings in general, it should be appreciated that schematic functional block diagrams are used to indicate functionality of systems and apparatus described herein. In addition, the processing functionality may also be provided by devices which are supported by an electronic device. It should be appreciated however that the functionality need not be divided in this way, and should not be taken to imply any particular structure of hardware other than that described and claimed below. The function of one or more of any of the elements shown or described may be further subdivided, and/or distributed throughout apparatus. In some implementations, the function of one or more elements may be integrated into a single functional unit. For example, while weightings have been shown and/or described as being applied at nodes or at edges, the disclosure is not so limited, and as such weightings may be applied at either location.

It should be appreciated each of the examples described herein may be implemented in a variety of different ways. Any feature of any aspects of the disclosure may be combined with any of the other aspects of the disclosure. For example, method aspects may be combined with apparatus aspects, and features described with reference to the operation of particular elements of apparatus may be provided in methods that do not use those particular types of apparatus. In addition, each of the features of each of the implementations is intended to be separable from the features that it is described in combination with, unless it is expressly stated that some other feature is essential to its operation. Each of these separable features may be combined with any of the other features of the implementations in which it is described, or with any of the other features or combination of features of any of the other implementations described herein. Furthermore, equivalents and modifications not described above may also be employed without departing from the invention.

Certain features of the methods described herein may be implemented in hardware, and one or more functions of the apparatus may be implemented in method steps. However, it should be appreciated that the methods described herein need not be performed in the order in which they are described, nor necessarily in the order in which they are depicted in the drawings. Further, aspects of the disclosure that are described with reference to products or apparatus are also intended to be implemented as methods and vice versa. The methods described herein may be implemented in computer programs, or in hardware or in any combination thereof. For example, each node may comprise a signal processing unit (e.g., implemented in a suitable circuit) configured to receive an input signal, process the input signal and provide an output signal. Nodes may comprise circuitry configured to: receive at least one input signal indicative of an item of input data from a preceding node connected to the node via an edge, perform an operation on the input data to provide output data, optionally scale the input data according to a weighting associated with the node; and provide an output signal indicative of the output data to a subsequent node via an edge in the graph. Edges may comprise communication paths configured for the transmission of signals between nodes. For example, the communication paths may be configured to receive an output signal from a preceding node, optionally scale that output signal according to a weighting, and transmit that output signal to a subsequent node. Localized data storage may be used for determining an end destination for transmitting the output signal to via the communication path.

Other embodiments of the disclosure may provide a non-transitory computer readable media and/or storage media, and/or a non-transitory machine readable medium and/or storage medium, having stored thereon, a machine code and/or a computer program having at least one code section executable by a machine and/or a computer, thereby causing the machine and/or computer to perform the steps as described herein. Computer programs include software, middleware, firmware, and any combination thereof. Such programs may be provided as signals or network messages and may be recorded on computer readable media such as tangible computer readable media that may store the computer programs in non-transitory form. Methods described herein and/or the functionality of components such as nodes and edges may be provided in hardware which includes computers, handheld devices, programmable processors, general purpose processors, application specific integrated circuits (ASICs), field programmable gate arrays (FPGAs), and arrays of logic gates. In some examples, one or more memory elements may store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A method comprising:
in a system comprising one or more processing circuits:
determining, by the one or more processing circuits, a preferred model for performing a selected task, wherein the determining comprises:
obtaining a computational graph comprising a plurality of nodes connected by a plurality of edges, and a plurality of weightings configured to scale input data provided to nodes along edges,
wherein the computational graph defines a first model and a second model,
wherein each of the first model and the second model comprises a subgraph in the computational graph, and
wherein one or more of the plurality of weightings are shared between the first model and the second model;
updating one or more weightings of the first model based on training the first model to perform the selected task;
updating one or more weightings of the second model based on training of the second model to perform the selected task, wherein:
updating the one or more weightings of the second model comprises updating at least one shared weighting, and
updating the at least one shared weighting is controlled based on an indication of importance for the first model a node and/or edge associated with the weighting;
configuring, via the one or more processing circuits, a controller for identifying of preferred models, wherein the controller is configured for performing analysis using one or both a reinforcement learning analysis and an evolutionary learning analysis; and identifying, by the controller, the preferred model based on an analysis of the first model and the second model, wherein the identifying comprises selecting a selection of nodes, edges and associated weightings from the computational graph; and
configuring, by the one or more processing circuits, a neural network to perform the selected task based on the preferred model.

2. The method of claim 1, comprising configuring the neural network for at least one of: natural language processing, image recognition, classification and/or modelling of physical systems, data processing and generation of search results.

3. The method of claim 1, comprising determining the indication of importance for each shared weighting using a measure based on a gradient or higher order derivative of a selected loss function with respect to the weighting.

4. The method of claim 3, wherein controlling the update to the at least one shared weighting comprises scaling a magnitude of the update based on a value for the measure.

5. The method of claim 1, comprising performing the selected task using the neural network.

6. The method of claim 1, wherein the selected task comprises one or more of natural language processing, image recognition, classification and/or modelling of physical systems, data processing, and generation of search results.

7. The method of claim 1, comprising initializing weightings of the second model, prior to training of the second model, based on the weightings of the first model.

8. The method of claim 1, wherein identifying the preferred model for the neural network comprises analyzing the first model and the second model using a policy based on at least one of reinforcement learning and evolutionary learning.

9. The method of claim 8, wherein identifying the preferred model comprises performing one or more steps that comprise:
determining which model performs best out of the first model and the second model based on testing both of the first model and the second model using a validation data set;
holding the value for the weightings constant and updating the policy of based on an analysis of the better performing model;
obtaining based on the updated policy, a suggestion for a third model and a fourth model, wherein some nodes, edges and weightings are shared between both of the third model and the fourth model;
updating the weightings of the third model based on training the third model to perform the selected task;
updating the weightings of the fourth model based on training the fourth model to perform the same selected task as the third model, wherein updating the weightings of the fourth model comprises updating some of the weightings which are shared between the third model and the fourth model, and wherein updating the at least one shared weighting is controlled based on an indication of importance for the third model a node and/or edge associated with the weighting is; and
identifying the preferred model based on an analysis of the third model and the fourth model.

10. The method of claim 8, comprising operating the controller based on the policy, wherein the operating comprises use of a reward based on: a component indicative of a goodness of fit for a model, and a component indicative of complexity of the model.

11. The method of claim 10, wherein the two components of the reward are separated and/or scaled to prevent the reward being negative.

12. The method of claim 8, comprising repeating the one or more steps for different suggested models until at least one of: a time threshold is reached, and a difference between a best performing model and a subsequently suggested model is below a threshold difference.

13. The method of claim 12, comprising selecting the best performing suggested model from a last iteration as the model architecture for the neural network configured to perform the selected task.

14. The method of claim 1, wherein obtaining a model comprises selecting nodes based on: the selected task, and an indication of a performance of the nodes on similar tasks to the selected task, for example, wherein the nodes comprise at least one of: neurons, and blocks of neurons.

15. The method of claim 1, comprising repeating the updating the one or more weightings of the first model, the updating the one or more weightings of the second model, and the identifying of the preferred model for the neural network for a selected number of times, wherein initially they are repeated without controlling the updates to weightings.

16. The method of claim 15, comprising repeating the updating the one or more weightings of the first model, the updating the one or more weightings of the second model, and the identifying of the preferred model for the neural network for a selected number of times initially without controlling the updates to weightings.

* * * * *